(12) United States Patent
Jin

(10) Patent No.: US 12,204,017 B2
(45) Date of Patent: Jan. 21, 2025

(54) SYSTEM AND METHOD OF DETECTING VEHICLES BEYOND A VIEW-BLOCKING VEHICLE

(71) Applicant: Xin Jin, Waterloo (CA)

(72) Inventor: Xin Jin, Waterloo (CA)

( * ) Notice: Subject to any disclaimer, the term of this patent is extended or adjusted under 35 U.S.C. 154(b) by 293 days.

(21) Appl. No.: 17/554,060

(22) Filed: Dec. 17, 2021

(65) Prior Publication Data

US 2022/0107404 A1    Apr. 7, 2022

(51) Int. Cl.
| | |
|---|---|
| *G01S 13/82* | (2006.01) |
| *G01S 13/86* | (2006.01) |
| *G01S 13/931* | (2020.01) |
| *G01S 17/931* | (2020.01) |

(52) U.S. Cl.
CPC ............ *G01S 13/82* (2013.01); *G01S 13/865* (2013.01); *G01S 13/931* (2013.01); *G01S 17/931* (2020.01)

(58) Field of Classification Search
CPC ...... G01S 13/82; G01S 17/931; G01S 13/865; G01S 13/931; G01S 13/003; G01S 17/003; G01S 2013/464; G01S 7/006
See application file for complete search history.

(56) References Cited

U.S. PATENT DOCUMENTS

| | | | | |
|---|---|---|---|---|
| 10,404,261 | B1* | 9/2019 | Josefsberg | G01S 13/931 |
| 2006/0155469 | A1* | 7/2006 | Kawasaki | G01S 13/931 |
| | | | | 340/436 |
| 2018/0259640 | A1* | 9/2018 | Correia | B60W 30/17 |
| 2019/0378356 | A1* | 12/2019 | Fang | G07C 5/008 |
| 2020/0408891 | A1* | 12/2020 | Brett | G01S 13/931 |

* cited by examiner

*Primary Examiner* — Olumide Ajibade Akonai
*Assistant Examiner* — Yonghong Li

(57) ABSTRACT

Radar and LiDAR sensors play important roles in autonomous vehicles and ADAS (advanced driving assistance systems) in automobiles, however, they can only detect objects in view (line-of-sight). For example, when three vehicles are driving on road in a same lane, and if the first vehicle suddenly brakes, the third vehicle cannot detect it by regular radar and/or LiDAR because the second vehicle in front blocks the view. This invention discloses system and method to enable radar and/or LiDAR to detect vehicles on road that are blocked in view by another vehicle by specially configured active beacon transmitters, and reduce risks of rear-end collisions.

13 Claims, 2 Drawing Sheets

SYSTEM AND METHOD OF DETECTING VEHICLES BEYOND A VIEW-BLOCKING VEHICLE

BACKGROUND OF THE INVENTION

Field of the Invention

This invention relates generally to detection of vehicles beyond line-of-sight, in particular, to system and method of detecting vehicles beyond a view-blocking vehicle using radar and/or LiDAR and active beacons.

Description of the Related Art

Sensors such as radar, LiDAR and camera are used to detect objects for autonomous vehicles and vehicles with advance driving and safety features such as advanced driver-assistance system (ADAS), autonomous emergency braking (AEB), advanced/automated emergency braking system (AEBS), adaptive cruise control (ACC), emergency brake assist, automatic emergency brake assist, etc. Typically such sensors only are able to detect objects within line-of-sight. However, in some use cases, detecting objects that are view-blocked by other objects is also very important. For example, in a highway driving scenario as shown in FIG. 1, three vehicles are driving in the same lane, the front vehicle 1 may suddenly brake, the second vehicle 2 in middle would take some time to react to the sudden change in speed and slow down to avoid collision. The third vehicle 3 could not "see" the first vehicle 1 due to view blockage of the middle vehicle 2, will have to start braking after seeing the middle vehicle 2 brakes. The delay caused by the reaction time between the first and the second vehicles (1 and 2) may put the third vehicle 3 in higher risk of collision with its front vehicle 2.

In the example of FIG. 1, radar and/or LiDAR sensors based on detecting reflected signals are used, the radar and/or LiDAR signals transmitted from vehicle 3 will be reflected by vehicles 2 and 4 and are detected by radar and/or LiDAR receivers on vehicle 3 to get distances and relative speeds of them, but vehicle 1 is undetectable by the radar and/or LiDAR on board of vehicle 3 due to blockage of vehicle 2.

In the example of FIG. 2, active beacons are installed on board of vehicles. Signals transmitted from the active beacons are used for detection by radar and/or LiDAR receivers. Radar beacons and radar receivers or LiDAR beacons and LiDAR receivers such as described in U.S. patent application Ser. Nos. 16/835,278, 16/917,805 and PCT/IB2020/061104 may be used. In the example shown, the radar and/or LiDAR receivers on vehicle 3 are able to detect beacon signals transmitted from vehicle 2 and 4, but are not able to detect beacon signals from vehicle 1 due to blockage of vehicle 2 in the middle.

If sensors equipped on vehicle 3 are able to sense the sudden braking of vehicle 1 immediately, regardless of the view blockage, it will give vehicle 3 additional time to react and reduce risks of accident. There is a need in the art to detect a vehicle that is blocked in view by another vehicle, including detecting existence, relative velocity, distance and angle of view thereof.

BRIEF SUMMARY OF THE INVENTION

In one aspect, the invention provides embodiments of a system of remote detection and ranging of a vehicle that is blocked in view by another vehicle, comprising at least one beacon signal transmitter, installed on a first vehicle, for transmitting beacon signals and marking a position of the first vehicle; and at least one sensing receiver, installed on a second vehicle, for detecting the beacon signals and measuring at least one of an existence, distance, velocity and angle of view of the first vehicle, relative to the second vehicle; wherein, the beacon signals are configured to include at least one beam or one part of a beam towards road so that said at least one beam or one part of the beam is scattered by the road and a scattered beacon signal is reachable to the sensing receiver, even when at least one third vehicle blocks a direct view between the second and the first vehicles.

In another aspect, at least one embodiment of the invention provides a method of remote detection and ranging of a vehicle that is blocked in view by another vehicle, comprising: marking a position of a vehicle being detected by installing at least one beacon transmitter on said vehicle; transmitting, from the beacon transmitter, at least one beam of beacon signal that is substantially synchronized to a time and frequency standard, towards road; receiving, by a receiver, the beacon signals transmitted by the beacon transmitter and scattered by surface of the road and objects on the road; processing the received beacon signals in reference with said time and frequency standards; and determining at least one of an existence, velocity, distance, angle of view of said beacon transmitter relative to said receiver.

Other aspects of the invention will become clear thereafter in the detailed description of the preferred embodiments and the claims.

DETAILED DESCRIPTION OF THE INVENTION

It will be appreciated that in the description herein, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention. Furthermore, this description is not to be considered as limiting the scope of the invention, but rather as merely providing a particular preferred working embodiment thereof.

For a better understanding of the invention and to show more clearly how it may be carried into effect, reference will now be made, by way of example only, to the accompanying drawings which illustrate distinctive features of at least one exemplary embodiment of the invention.

Figure 1:
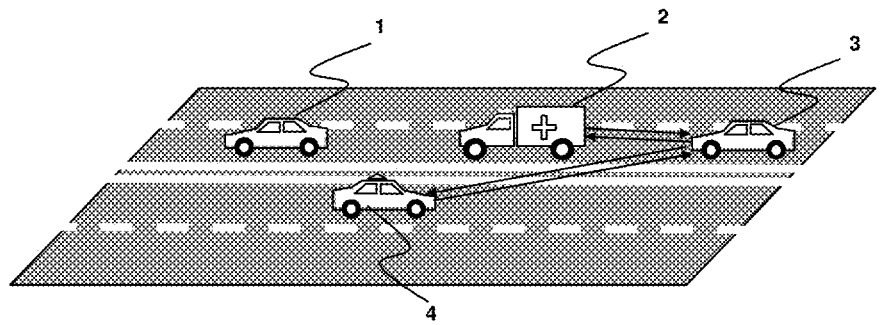
FIG. 1 illustrates how a radar and/or LiDAR detects vehicles through reflected radar and/or LiDAR signals (prior art)
Figure 2:
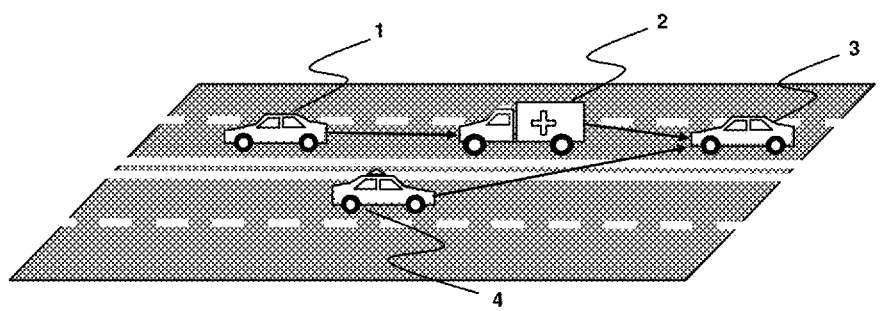
FIG. 2 illustrates how a radar and/or LiDAR receiver detects signals transmitted from active beacons for purpose of detecting vehicles (prior art)
Figure 3:
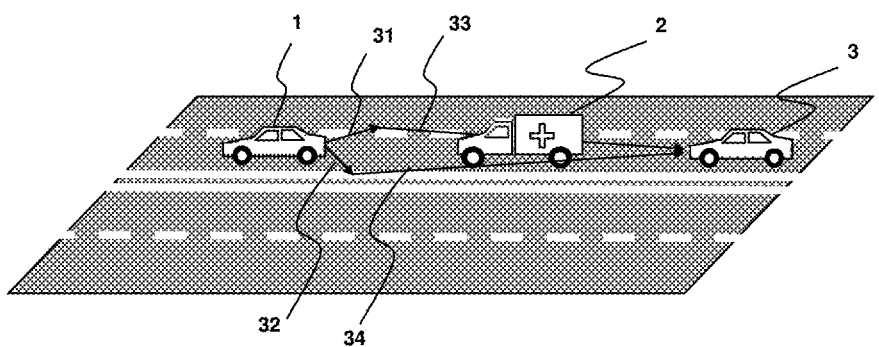
FIG. 3 illustrates an example how vehicle beacon signals can be configured so as to be detectable by a radar and/or a LiDAR receiver when line-of-sight signals are blocked by another vehicle (the drawing is not to scale)

Referring to FIG. 3, active beacon transmitters are installed on vehicles such as vehicle 3 in the figure. In one embodiment, the beacon transmitter may be a beacon transmitter of radar signals such as one described in U.S. patent application Ser. No. 16/835,278, which may transmit radar beacon signals in millimeter band (e.g., in the 76-81 GHz band). The beacon signals preferably including beams 31, 32 towards to roadsides that cause the beacon signals being reflected by surface of roads as well as other roadside structures. Some of the reflected waves (e.g., marked as 33, 34 in drawing) are able to reach the radar receiver on vehicle 3, without being otherwise blocked by vehicle 2. Through the reflected signals the radar receiver on vehicle is able to detect the existence of vehicle 1, relative speed between vehicles 1 and 3 are also be able to detect through, e.g., Doppler effects or differentials of distance measurements. Distance between the object vehicle 1 and sensing vehicle 3 is actually measured from length of polyline of signal propagation rather than a straight line in a line-of-sight case, this will be discussed further hereinafter. Alternatively, the beacon signal may also illuminate the road surface below the view-blocking vehicle 2, and be reflected to reach to the receiver on sensing vehicle 3 (not shown in drawing).

In another embodiment, the beacon transmitter may be one of LiDAR signals such as one described in U.S. patent application Ser. No. 16/917,805, which may transmit LiDAR beacon signals in infrared light band (e.g., 1550 nm wavelength band), and the sensing receiver be a LiDAR receiver. Again, the beacon signal beams may be configured to illuminate roadside or road surface below the view-blocking vehicle, so as to get around the blockage.

Figure 4:
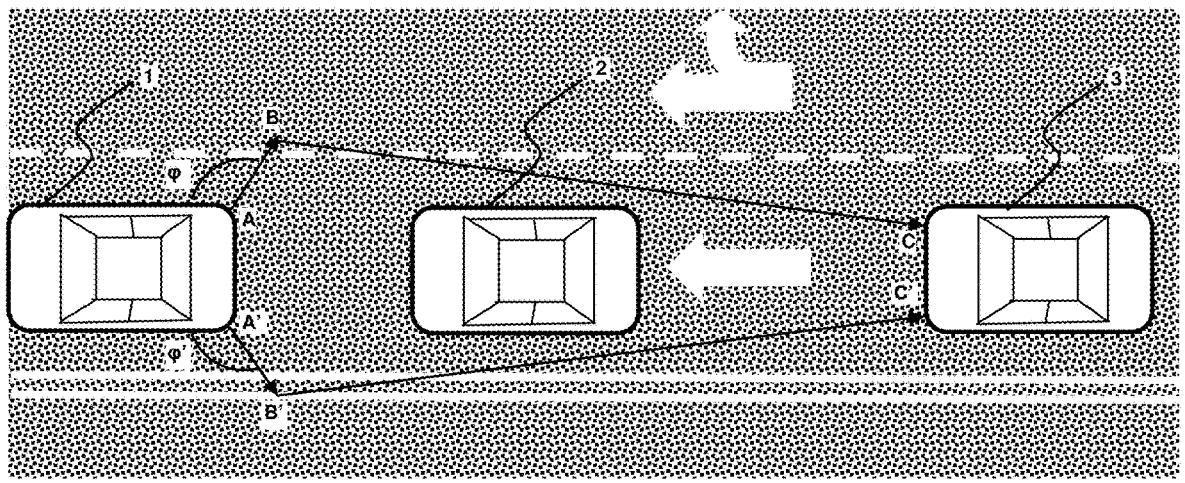
FIG. 4 is a top view showing beams of vehicle beacon signals propagate when line-of-sight may be blocked (the drawing is not to scale).

Now referring to FIG. 4, we discuss how a radar or LiDAR can detect the distance between an object vehicle and a sensing vehicle accurately when the beacon signal is traveling along a polyline rather than a straight line (line-of-sight). FIG. 4 is an exemplary top view of three vehicles driving on road in a lane towards left in drawing. Vehicle 1 is the intended object for detection; vehicle 3 is the sensing vehicle that tries to detect vehicle 1; in the middle, vehicle 2 blocks the view of vehicle 3 towards vehicle 1. In the exemplary embodiment, beacon transmitter emitting points are located at A and A' on rear sides of vehicle 1, and the transmitted beams illuminate the points B and B' on surface of roadsides, and their reflected waves will be able to reach the receiving devices of radar (or LiDAR) installed at point C and point C', respectively, on vehicle 3. Ideally, the beacon and the radar/LiDAR would measure and report the straight line distance between A and C (or A' and C'), but as we mentioned, without corrections made, the radar/LiDAR would measure and report the total length of polyline A to B and B to C (or that of polyline A' to B' and B' to C'), which is longer than the straight line distance. Although in many use cases, using the measured raw polyline length as approximation to the true distance is acceptable, we will herein provide embodiments to get more accurate distance results.

Continue to refer to FIG. 4, in one preferred embodiment, the beams of the beacon signal A-B and A'-B' are configured to point to a predetermined angle (marked as φ and φ' in drawing) that is made known to the radar/LiDAR receivers on sensing vehicle 3, and so are the distances of the illuminated spot B from its emitting points A, and spot B' from its emitting points A'. This way, based on known values of angles φ and φ' and distances AB and A'B', the radar/LiDAR post processing algorithm can correct errors in distance. For example, if choosing the beam aiming angle φ=φ'=90 degrees, and aiming spot B to make distance AB to v meters, then the radar/LiDAR should report (corrected) distance by square root of $(r^2-2\,v\,r)$, where r is radar/LiDAR measured raw distance (the polyline length AB and BC or A'B' and B'C'). The key to this embodiment is values of angle φ and distance AB are made known to the receiver processor. One way is to make them as industrial standards, e.g., all vehicles carrying beacons for this purpose shall illuminate roadside at spot 3 meters from side of vehicle and 0 meters from the rear bumper extension line (i.e., φ=φ'=90 degrees and AB=A'B'=3 meters). In an alternative embodiment, a plurality of spots may be illuminated on road, e.g., at four spots AB=A'B' at [2, 2.5, 3, 3.5] meters, φ=φ'=90 degrees. When the receiver detect at least one of the illuminated spots, by identifying which of the spots is detected, applying the corresponding parameters for post processing, a correct distance can be computed. A number of ways may be used to identify a detected spots, which will not be elaborated herein.

For easier understanding of the methods, in the description and analysis, we used 2D geometry in FIG. 4 and ignored the third dimension associated with the heights of mounting points of beacon emitters and radar/LiDAR receivers above road surface. It should be noted that the post processing to calculate corrected distance from raw measured polyline length should use 3D geometry that includes the influence by the heights. Since it is a well-known art of geometry, it is not further elaborated herein. As long as the height or an approximation of the height for the emitters are also known to the receiver processor, a correct distance can be computed.

Also referring to FIG. 4, in another preferred embodiment, the distance between the illuminated spot and the emitter, AB or A'B', is locally measured by the beacon device installed on an object vehicle 1, and the locally measured value is embedded in message carried by the transmitted beam of beacon signal, and is decoded by radar/LiDAR receiver for use in computing corrected distance. Angles φ and φ' as well as heights of emitters may also be coded into beacon messages for use in post processing.

Referring to FIG. 4 again, in yet another preferred embodiment, the beam of beacon signal is configured to time-advance by an amount of (r−d)/c, or an approximation to it, where r is the total polyline length of beam propagation from the beacon emitter to the radar/LiDAR receiver (e.g., AB and BC in drawing), d is the straight line distance from the beacon emitter to the radar/LiDAR receiver (e.g., A to C in drawing but the line is not shown), c is the speed of light. The time advance will make the raw measured distance obtained in the same way as line-of-sight beacon measurement be the true distance in value. The amount of time-advance is applied in the transmitter end for the roadside beams, the radar and/or LiDAR receivers do not need to distinguish a line-of-sight beam or a reflected beam in processing. Again, although we used 2D top-view drawing to describe the method, the actual calculation of time-advance for reflected beams should preferably take into account of heights and use 3D geometry. In an alternative embodiment, a plurality of beams of beacon signals illuminate a plurality of spots on roadside, each of the beams are configured to have an amount of time advance according to individual (r−d)/c of the beam. For example, when φ and φ' are close to 90 degrees, distance BC is much greater than AB in the use cases, (r−d) is approximately equal to distance AB, the amount of time-advance may be configured to AB/c.

In application for vehicle braking control, measuring speed and speed changes is in many cases more important than measuring distance, when the object vehicle is blocked in view by another vehicle, distance measurement errors caused by beam reflection may be tolerable. Although the reflection paths of beacon beams may also cause errors in speed measurement, but the amount of errors is usually negligible. With such tolerances accepted, the beacon signals may illuminate broadly in wide scope of directions, and no need to be controlled in small spots. As such, line-of-sight and reflected beacon signals may also be processed in same way.

Also since measuring speed and speed changes is more important than measuring distance in most cases of vehicle braking control, in one embodiment, only existence and speed detection of a view blocked vehicle is carried out, and not distance. In such embodiment, CW (continuous wave) rather than FMCW (frequency modulated continuous wave) beacons and radar/LiDAR may be used, as described in, e.g., U.S. patent application Ser. Nos. 16/835,278, 16/917,805 and PCT/IB2020/061104.

Certain terms are used to refer to particular components. As one skilled in the art will appreciate, people may refer to a component by different names. It is not intended to distinguish between components that differ in name but not in function. Also, certain terms are used interchangeably, e.g., speed and velocity; sensor, radar and LiDAR; sensing receiver, radar receiver, and LiDAR receiver; active beacon, radar beacon and LiDAR beacon, etc.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances.

It should be understood that various modifications can be made to the embodiments described and illustrated herein, without departing from the invention, the scope of which is defined in the appended claims.

I claim:

1. A system of remote detection and ranging of a vehicle that is blocked in view by another vehicle, comprising:
   at least one beacon signal transmitter, installed on a first vehicle or first vehicles, configured to transmit a beacon signal or beacon signals that is/are a radar signal and/or a LiDAR signal, or radar signals and/or LiDAR signals, and mark a position of the first vehicle or each of the first vehicles;
   at least one detection and ranging receiver, installed on a second vehicle or second vehicles, configured to detect the first vehicle or one of the first vehicles by detecting the beacon signal or beacon signals, including measuring at least one of a distance and a velocity of said first vehicle or said one of the first vehicles, relative to the second vehicle or one of the second vehicles installing said at least one detection and ranging receiver;
   wherein said beacon signal or beacon signals is/are configured to include at least one beam, or part of said at least one beam towards road and/or roadside so that said at least one beam of said beacon signal or beacon signals, after being scattered one-time by the road and/or roadside, is reachable to and detectable by the at least one detection and ranging receiver, even when a third vehicle blocks a direct view between the second and the first vehicles; and
   wherein the beacon signal or beacon signals that is/are transmitted by the at least one beacon signal transmitter on said first vehicle or first vehicles and a reference local replica signal in each of the at least one detection and ranging receiver on said second vehicle or second vehicles are simultaneously on and are substantially synchronized to have at least one of:
   a substantially identical frequency of a CW (continuous wave) carrier;
   a substantially identical frequency of a CW (continuous wave) modulating signal;
   a substantially aligned timing and substantially identical frequency of a FMCW (frequency modulated continuous wave) carrier; and
   a substantially aligned timing and substantially identical frequency of a FMCW (frequency modulated continuous wave) modulating signal.

2. The system of remote detection and ranging of claim 1 is at least one of:
   a system of Radio Detection And Ranging (radar), and wherein said at least one beacon signal transmitter emits radar signals, and said at least one detection and ranging receiver is a radar receiver; and
   a system of Light Detection And Ranging (LiDAR), and wherein said at least one beacon signal transmitter emits LiDAR signals, and said at least one detection and ranging receiver is a LIDAR receiver.

3. The system of remote detection and ranging of claim 1, wherein said at least one beam, or part of said at least one beam towards the road and/or roadside is configured to illuminate at least one of:
   the road surface and objects at roadside; and
   the road surface below the third vehicle.

4. The system of remote detection and ranging of claim 1, wherein said substantial synchronization between the beacon signal or beacon signals and the reference local replica signal in each of the at least one detection and ranging receiver is achieved by at least one of
   locking to a common frequency and timing source; and
   locking to high precision time and frequency standards.

5. The system of remote detection and ranging of claim 1, wherein the at least one detection and ranging receiver on said second vehicle or second vehicles detects at least one of:
   a presence of the first vehicle or each of the first vehicles;
   a velocity of the first vehicle or each of the first vehicles relative to the second vehicle or one of said second vehicles in question;
   a distance of the first vehicle or each of the first vehicles relative to the second vehicle or one of said second vehicles in question; and
   an angle of view of the first vehicle or each of the first vehicles relative to the second vehicle or one of said second vehicles in question;
   and wherein said detection is through at least one of:
   direct line-of-sight propagation delay of the beacon signal or beacon signals; and
   one-time scattered propagation delay of the beacon signal or beacon signals.

6. The system of remote detection and ranging of claim 1, wherein said beacon signal or beacon signals is/are further configured to include at least one beam towards roadside, each of said at least one beam aims at a predetermined angle of orientation relative to the first vehicle or one of the first vehicles in question, and illuminates a spot on roadside centered at a predetermined distance from its emitting source on the first vehicle or one of the first vehicles in question.

7. The system of remote detection and ranging of claim 1, wherein each of the at least one beam of said beacon signal or beacon signals towards road and/or roadside is further configured to advance in timing by an amount as close as possible to an increase in distance caused by scattered propagation over a line-of-sight distance between the first and the second vehicles, divided by light speed c.

8. A method of remote detection and ranging of a vehicle that is blocked in view by another vehicle, comprising:
   marking a position of a first vehicle or each of first vehicles being detected by installing at least one beacon signal transmitter on said first vehicle or each of said first vehicles;
   transmitting, from the at least one beacon signal transmitter, a signal or beacon signals that is/are a radar signal and/or a LiDAR signal, or radar signals and/or LiDAR signals, and that is/are continuously on and substantially synchronized to a time and frequency standard, and at least one beam or part of at least one beam of said beacon signal or beacon signals is configured to transmit towards road and/or roadside so that said beacon signal or beacon signals is/are visible to a second vehicle or one of second vehicles after being scattered one-time by the road and/or roadside, even when there exists a third vehicle blocking a direct view between the first vehicle or one of the first vehicles in question and the second vehicle or one of the second vehicles in question;
   receiving, by a detection and ranging receiver on the second vehicle or each of the second vehicles, the beacon signal or the beacon signals after being scattered one-time by said road and/or roadside;
   processing, by the detection and ranging receiver on the second vehicle or each of the second vehicles, the received beacon signal or received beacon signals in reference with a local replica signal that is substantially synchronized to said time and frequency standard; and
   determining at least one of a velocity and a distance of said at least one beacon signal transmitter relative to said detection and ranging receiver;
   wherein, said beacon signal or beacon signals and said local replica signal being synchronized to said time and frequency standard comprises at least one of:
   a substantially identical frequency of a CW (continuous wave) carrier;
   a substantially identical frequency of a CW (continuous wave) modulating signal;
   a substantially aligned timing and substantially identical frequency of a FMCW (frequency modulated continuous wave) carrier; and
   a substantially aligned timing and substantially identical frequency of a FMCW (frequency modulated continuous wave) modulating signal.

9. The method of remote detection and ranging of a vehicle that is blocked in view by another vehicle of claim 8, wherein the remote detection and ranging includes at least one of Radio Detection And Ranging (radar) and Light Detection And Ranging (LiDAR), the at least one beacon signal transmitter includes at least one of a radar beacon signal transmitter and a LiDAR beacon signal transmitter, the detection and ranging receiver includes at least one of a radar receiver and a LiDAR receiver.

10. The method of remote detection and ranging of a vehicle that is blocked in view by another vehicle of claim 8, further comprises:
   parameter values related to determining an amount of propagation distance increase over line-of-sight distance caused by scattering of said beacon signal or beacon signals are made available to said detection and ranging receiver; and the determining step includes correcting said propagation distance increase caused by scattering of said beacon signal in determining the distance of said at least one beacon signal transmitter relative to said detection and ranging receiver.

11. The method of remote detection and ranging of a vehicle that is blocked in view by another vehicle of claim 8, wherein said synchronization to the time and frequency standard in the transmitting step further includes to advance timing of the beacon signal or beacon signals sent towards road and/or roadside by an amount that equals to or approximately equals to d/c, where d is the increase in propagation distance of a beacon signal caused by said one-time scattering, and c is the speed of light.

12. A system of remote detection and ranging of a vehicle that is blocked in view by another vehicle, comprising:
   at least one beacon signal transmitter, installed on a first vehicle or first vehicles, configured to transmit a beacon signal or beacon signals that is/are a radar signal and/or a LIDAR signal, or radar signals and/or LiDAR signals, and mark a position of the first vehicle or each of the first vehicles;
   at least one detection and ranging receiver, installed on a second vehicle or second vehicles, configured to detect the first vehicle or one of the first vehicles by detecting the beacon signal or beacons signals, including measuring at least one of a distance and a velocity of the first vehicle or the one of the first vehicles, relative to the second vehicle or one of the second vehicles installing said at least one detection and ranging receiver;
   wherein said beacon signal or beacon signals is/are configured to include at least one beam, or part of said at least one beam towards road and/or roadside so that said at least one beam of said beacon signal or beacon signals, after being scattered one-time by the road and/or roadside, is reachable to and detectable by the at least one detection and ranging receiver, even when a third vehicle blocks a direct view between the second and the first vehicles; and
   wherein the beacon signal or beacon signals that is/are transmitted by the at least one beacon signal transmitter on said first vehicle or first vehicles and a reference local replica signal in each of the at least one detection and ranging receiver on said second vehicle or second vehicles are substantially synchronized.

13. The system of remote detection and ranging of claim 12, wherein the beacon signal or beacon signals that is/are transmitted by the at least one beacon signal transmitter on said first vehicle or first vehicles and the reference local replica signal in each of said at least one detection and ranging receiver on said second vehicle or second vehicles are substantially synchronized in at least one of: a substantially identical frequency of a CW (continuous wave) carrier; a substantially identical frequency of a CW (continuous wave) modulating signal; a substantially aligned timing and substantially identical frequency of a FMCW (frequency modulated continuous wave) carrier; and a substantially aligned timing and substantially identical frequency of a FMCW (frequency modulated continuous wave) modulating signal.

* * * * *